US005769428A

United States Patent [19]

Rypalla

[11] Patent Number: 5,769,428

[45] Date of Patent: Jun. 23, 1998

[54] DEVICE FOR SEALING A HOOD THAT PROTECTS A TUMBLING BARREL

[75] Inventor: Mark Rypalla, Hamminkeln, Germany

[73] Assignee: A. Friedr. Flender AG, Bocholt, Germany

[21] Appl. No.: 741,516

[22] Filed: Oct. 31, 1996

[30] Foreign Application Priority Data

Nov. 15, 1995 [DE] Germany ........................ 195 42 563.4

[51] Int. Cl.[6] ............................. F16J 15/24; F16J 15/447

[52] U.S. Cl. .......................... 277/350; 277/355; 277/510; 277/578; 277/589; 277/903; 432/115

[58] Field of Search .................................... 277/165, 142, 277/143, 105, 121, 64, 53; 432/115, 64, 242

[56] References Cited

U.S. PATENT DOCUMENTS

| | | | |
|---|---|---|---|
| 2,441,901 | 5/1948 | Petersen . | |
| 3,874,679 | 4/1975 | Kaller | 277/37 |
| 4,213,754 | 7/1980 | Wens | 432/115 |
| 4,804,195 | 2/1989 | Parker | 277/12 |
| 5,184,782 | 2/1993 | Kerstges et al. | 241/171 |
| 5,425,543 | 6/1995 | Buckshaw | 277/3 |
| 5,647,598 | 7/1997 | Vaudolon | 277/64 |

FOREIGN PATENT DOCUMENTS

| | | | |
|---|---|---|---|
| 175109 | 8/1985 | European Pat. Off. . | |
| 4140388 | 6/1993 | Germany . | |
| 2239925 | 7/1991 | United Kingdom | 277/165 |

*Primary Examiner*—Randolph A. Reese
*Assistant Examiner*—John L. Beres
*Attorney, Agent, or Firm*—Max Fogiel

[57] ABSTRACT

A device for oil-impermeably sealing a stationary hood (6) off from a rotating, tumbling barrel, containing at least one stationary packing cord (7) which is forced against a race (8) by a pre-stressed and compressed gasket (9). The race is part of the barrel and rotates along with it. A cap (10) is connected to the hood (6) and demarcates in conjunction with part of the hood's end wall a region of expansion for the packing cord (7) and the gasket (9).

3 Claims, 3 Drawing Sheets

DEVICE FOR SEALING A HOOD THAT PROTECTS A TUMBLING BARREL

BACKGROUND OF THE INVENTION

The present invention concerns a device for oil-impermeably sealing a non-rotating hood off from a rotating tumbling barrel.

The known oil-impermeable seals for tumbling barrels (German OS 4 140 388 and Europe Patent 175 109) are similar in design to radial shaft seals. A sharp-edged lip seals off the non-rotating hood from the barrel or from a similar surface on a crown that extends around it. The high temperatures at the surface of the barrel and the considerable dust that results from the tumbling make the sealant (purbunane) brittle, and the seal fails.

SUMMARY OF THE INVENTION

The object of the present invention is accordingly to improve the generic device for sealing a hood that protects a tumbling barrel to the extent that the seal is simple in design and to assemble and in that cost-effective and long-lasting materials can be employed.

BRIEF DESCRIPTION OF THE DRAWINGS

Several embodiments of the present invention will now be specified with reference to the accompanying drawing, wherein.

DESCRIPTION OF THE PREFERRED EMBODIMENTS

Figure 1:
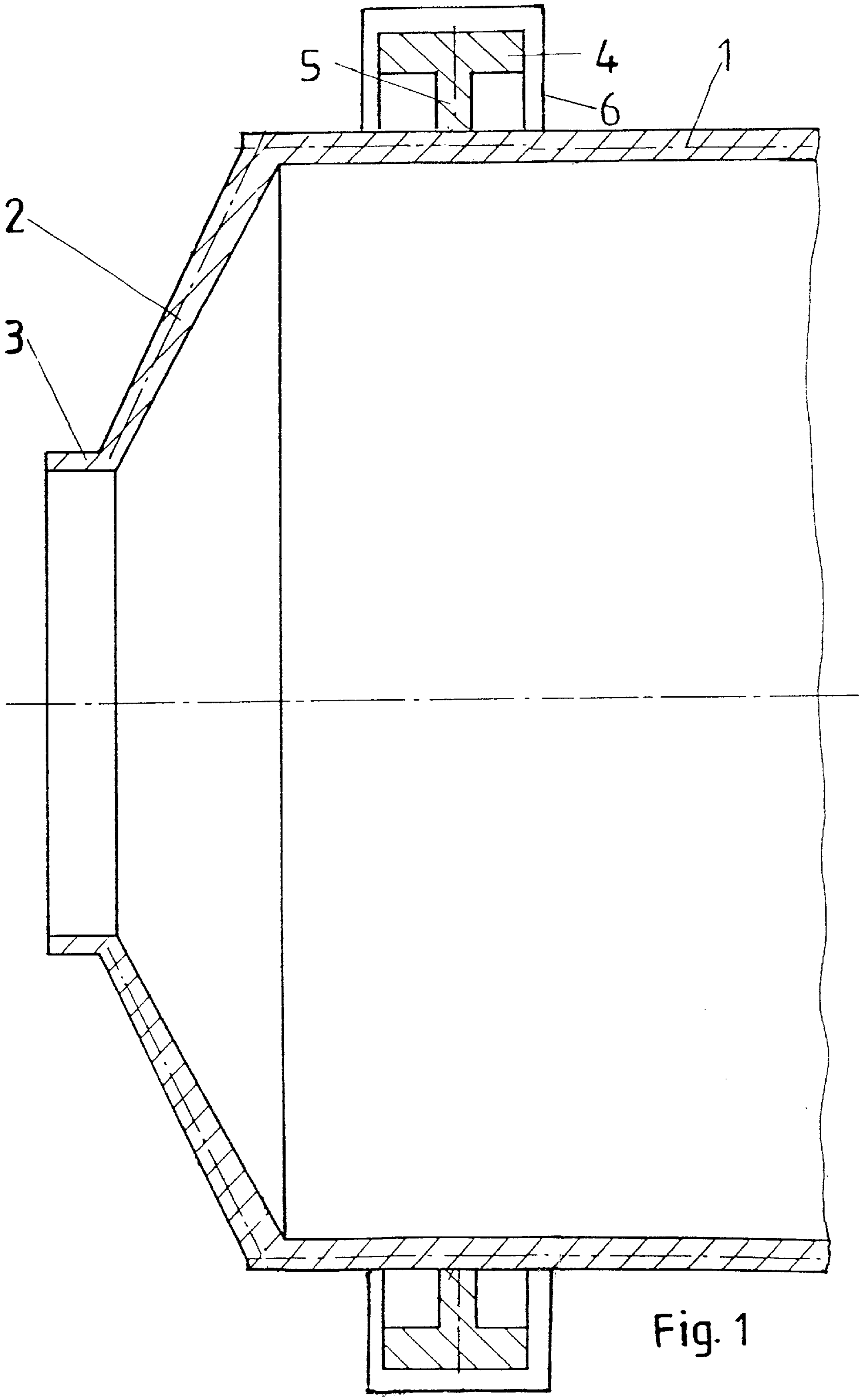
FIG. 1 is a longitudinal section through one end of a tumbling barrel.

A tumbling barrel has a cylindrical surface 1 and a conical face 2. Surface 1 and face 2 are lined with a wear-resistant material. At roller face 2 is a connection 3 for introducing the material being milled into the barrel and for removing the milled material from it by way of a current of hot air.

Extending around roller surface 1 are two races 4, only one of which is illustrated. Each race 4 is secured to the surface by a web 5. Each race 4 is secured rests against an unillustrated oil-lubricated shoes. The tumbling barrel is conventionally rotated by a motor by way of a pinion on the end of its shaft. The pinion engages a crown that extends around and is fastened to barrel surface 1. Race 4 and its bearing or crown are accommodated in a non-rotating hood 6.

Figure 2:
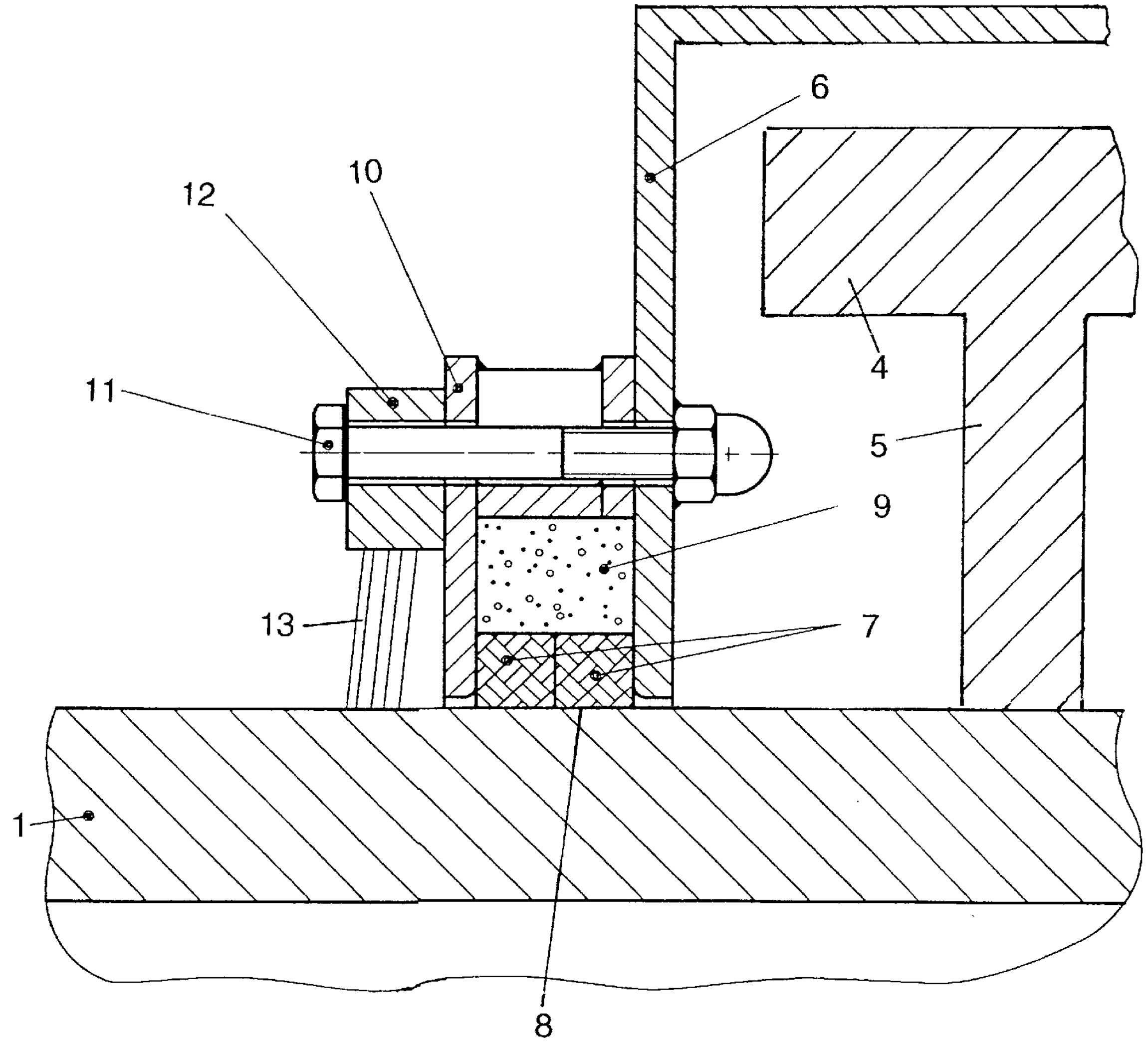
FIG. 2 is a detail of the area Z in FIG. 1.

The non-rotating hood 6 is sealed off oil-tight from the rotating tumbling barrel as will now be specified. The system employs one or more lengths of wear-resistant and heat-resistant packing cord 7 as illustrated in FIG. 2. Packing cord 7 slides along a race 8 machined into barrel surface 1.

Each length of packing cord 7 rests against a gasket 9 that provides enough resilience to ensure a tight seal. Gasket 9 also compensates for discrepancies in radial true in the embodiment illustrated in FIG. 2 and similar to a radial seal and for any discrepancies in axial true in the embodiment illustrated in FIG. 3 and similar to a face seal.

An annular cap 10 in one or more parts is secured to hood 6 by threaded bolts 11, forcing resilient gasket 9 and cord 7 against hood 6. Cap 10 demarcates in conjunction with part of the end wall of hood 6 a region of expansion wherein gasket 9 is maintained under constant compression and protected from the environment. The gaps between rotating race 8 and non-rotating cap 10 and between rotating race 8 and non-rotating hood 6 are as narrow as possible to prevent cord 7 from bulging out axially. There is a similar sealing system at the unillustrated other end of the tumbling barrel.

Fastened, also by bolts 11, to the surface of cap 10 facing away from hood 6 is an annular brush 12 with its bristles 13 resting against barrel surface 1. Brush 12 insulates the seal from coarse environmental contaminants and from hard deposits that could damage cord 7.

Although the tumbling barrel illustrated herein rotates around a horizontal axis, the present invention also applies to barrels that rotate around a vertical axis.

Figure 3:
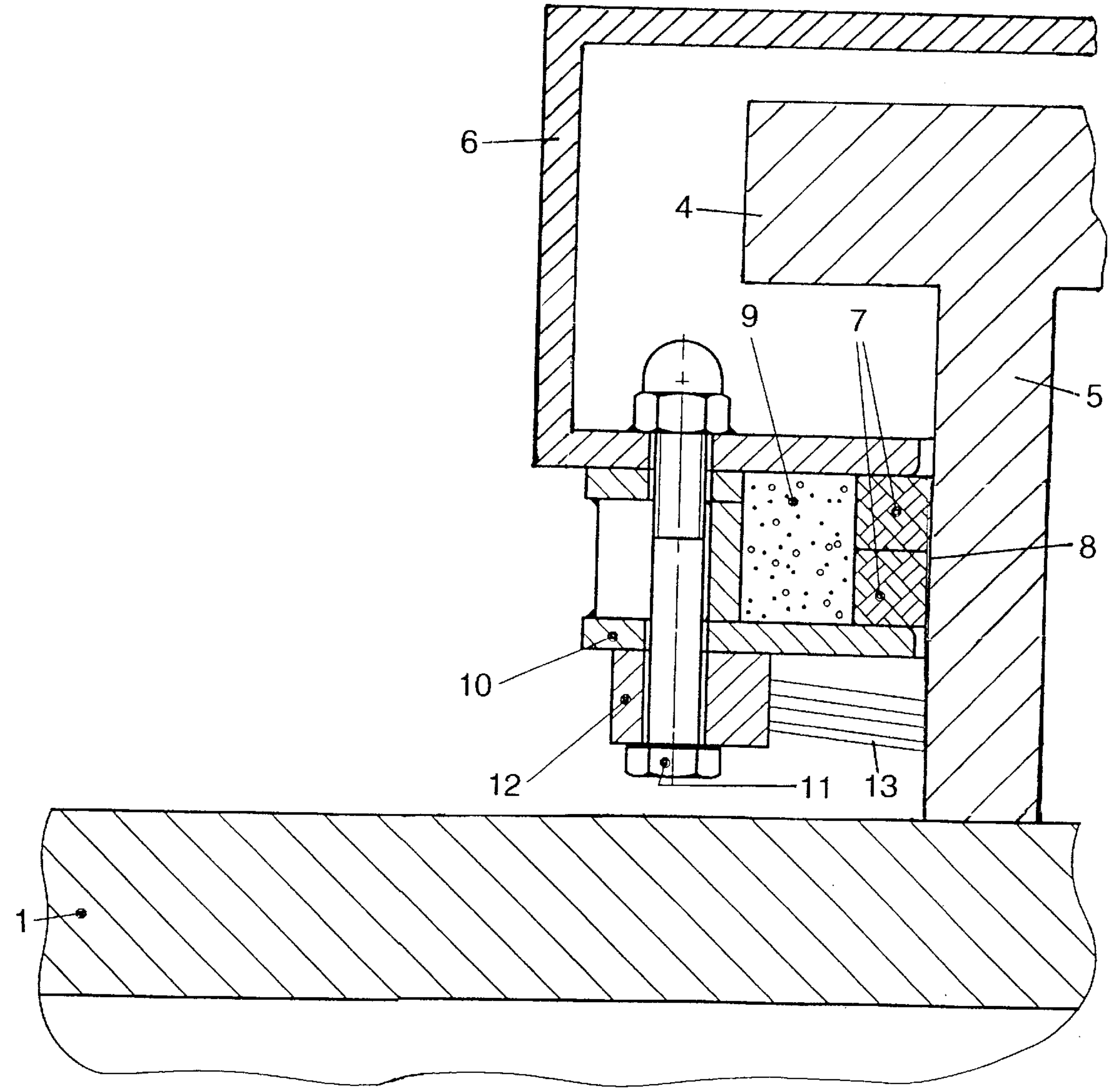
FIG. 3 illustrates another embodiment of the present invention.

The seal illustrated in FIG. 2 is radial, and its race 8 parallels the barrel's axis of rotation. The device in accordance with the present invention can also function, however, as an axial seal as illustrated in FIG. 3. In this event the race 8 that accommodates cord 7 is perpendicular to the axis of rotation and machined into the web 5.

I claim:

1. An arrangement for sealing a rotating drum of a tubular mill relative to a stationary hood surrounding said drum comprising: a rotating drum and a stationary hood surrounding said drum; a race with running surface formed on said drum and being a part of said drum, said running surface rotating with said drum about an axis of rotation; at least one stationary sealing cord comprised of a wear-resistant and temperature dependent material, said cord being held on the hood and being pressed against said running surface; a compressible pre-stressed ring for supporting said cord and producing pressure for pressing said cord to said running surface; a holding plate in form of a cap secured to said hood by screws, said hood having a sidewall, said holding plate and a part of said sidewall demarcating an expansion chamber for receiving said compressible ring and said cord; said screws in combination with said holding plate holding said compressible ring within said expansion chamber under constant pre-stressing; a brush ring secured to said hood on a side of said cord facing away from said hood; said brush ring having bristles lying on said running surface; a narrowest possible gap between said rotating running surface and said hood and said holding ring for preventing a sidewise bulging out of said cord.

2. An arrangement as defined in claim, 1, wherein said running surface is parallel to said axis of rotation, said sealing arrangement being a radial seal.

3. An arrangement as defined in claim 1, wherein said running surface is perpendicular to said axis of rotation, said sealing arrangement being an axial seal.

* * * * *